United States Patent

Nakagawa et al.

[11] Patent Number: 5,170,082
[45] Date of Patent: Dec. 8, 1992

[54] YOKE OF STEPPING MOTOR AND METHOD FOR MANUFACTURING THE SAME

[75] Inventors: Fujio Nakagawa; Masami Wada, both of Hirakata, Japan

[73] Assignee: Matsushita Electric Industrial Co., Ltd., Kadoma, Japan

[21] Appl. No.: 701,751

[22] Filed: May 17, 1991

Related U.S. Application Data

[62] Division of Ser. No. 557,991, Jul. 26, 1990, Pat. No. 5,020,211.

[30] Foreign Application Priority Data

Nov. 22, 1989 [JP] Japan ................................. 1-304125

[51] Int. Cl.$^5$ ............................................. H02K 15/12
[52] U.S. Cl. ..................................... 310/45; 310/257; 310/49 A
[58] Field of Search ................... 310/42, 45, 154, 156, 310/257, 263, 49 A

[56] References Cited

U.S. PATENT DOCUMENTS

| | | | |
|---|---|---|---|
| 3,867,658 | 2/1975 | Dochterman | 310/71 |
| 4,381,465 | 4/1983 | Renkl et al. | 310/49 R |
| 4,884,333 | 12/1989 | Cooper et al. | 29/596 |
| 5,020,211 | 6/1991 | Nakagawa et al. | 29/596 |
| 5,045,739 | 9/1991 | Kuwahara | 310/105 |

Primary Examiner—Steven L. Stephan
Assistant Examiner—Judson H. Jones
Attorney, Agent, or Firm—Cushman, Darby & Cushman

[57] ABSTRACT

In a method for manufacturing yokes (3, FIG. 1) to be used in a permanent magnet type stepping motor (10, FIG. 2), a surface-treated dead soft steel sheet such as nickel-plated steel sheet or aluminized steel sheet containing carbon in 0.01 wt. % or less is press-worked to form yoke (3) having plural pole teeth (3a, FIG. 1) on its inner periphery, and then the yoke is annealed in an inactive gas atmosphere in a temperature range of 750°-820° C. to remove residual stress, and permeability of the yoke is improved.

4 Claims, 3 Drawing Sheets

YOKE OF STEPPING MOTOR AND METHOD FOR MANUFACTURING THE SAME

This is a division of application Ser. No. 07/557,991, filed July 26, 1990 U.S. Pat. No. 5,020,211.

BACKGROUND OF THE INVENTION

1. Field of the Invention

The present invention relates to an improvement in a yoke of stepping motor and method for manufacturing the same.

2. Description of the Prior Art

In recent years, a permanent-magnet type stepping motor (hereinafter abbreviated as PM type stepping motor) has been advanced to be light-weighted, thinned, shortened and small-sized. Furthermore, the PM type stepping motor is required to be manufactured in a low cost and to have high performance.

A conventional PM type stepping motor 10 is described referring to FIGS. 1 and 2. FIG. 1 is a perspective view showing conventional yokes 3 and 3 which are used in the conventional stepping motor 10. FIG. 2 is a cross-sectional side view showing the constitution of the conventional and typical stepping motor 10.

In FIG. 1, which is an exploded perspective view of an upper stator 11a, an upper yoke 31 and a lower yoke 32, which are made of a magnetic material such as low carbon steel sheet, respectively have plural upward pole teeth 31a, ... and plural downward pole teeth 32a, ... on their inner periphery parts. A coil is wound on a bobbin 2 of an insulation material. The upper yoke 31 and the lower yoke 32 are fitted to the upper and the lower faces 2a and 2b of the bobbin 2, respectively. The pole teeth 31a, ... and 32a, ... are fit in an inner hole 2c of the bobbin 2 in a manner that the pole teeth 31a, ... of the upper yoke 31 and the pole teeth 32a, ... of the lower yoke 32 make alternate row of circularly disposed magnetic pole pieces. Thus, an assembly of the upper yoke 31, the coil 1 on the bobbin 2 and the lower yoke 32 constitutes the upper stator part 11a.

As shown in FIG. 2, the stator 11 comprises the upper stator part 11a and a lower stator part 11b. The lower part 11b is configured quite equivalent to the upper part 11a. The upper part 11a and the lower part 11b of the stator 11 are tightly piled up. The coils 1a and 1b of the upper and lower parts 11a and 11b of the stator 11 are, for example, alternately magnetized by a known stepping-motor driving circuitry. A cup-shaped frame 4 is made of a magnetic material e.g. dead-soft steel sheet. Outer peripheries of the stator 11, namely outer periphery edges of the yokes 31, 31 and 32, 32 contact the inner vertical face 4b of the frame 4, to form magnetic circuits. The frame 4 has a bearing 6 at its top center part for rotatably bearing a shaft of a rotor 5. The rotor 5 comprises a cylindrical core 5b made of non-magnetic die-cast or industrial resin and a plurality of vertical rod-shaped permanent magnets 5c, ... provided circularly on cylindrical outer face of the core 5b. The rotor 5 is rotated by magnetic attraction and magnetic repulsion between the pole teeth 31a, ... and 32a, ... and the permanent magnets 5c, .... A bracket 8 having a bearing 7 for rotatably bearing lower part of the shaft 5a of the rotor 5 is fit in an opening 4a of the frame 4.

In the conventional PM type stepping motor 10 constituted as mentioned above, the yokes 3, ... are made of galvanized low carbon steel sheet (galvanized steel sheet) which has a good workability. And the yokes 3, ... are formed by press working. Such a galvanized low carbon steel, however, has low permeability as a magnetic material after being press worked. Therefore, the PM type stepping motor using the yokes 3, ... made of such a galvanized low carbon steel sheet after press working can not have high performance. Accordingly, for improving the performance of the PM type stepping motor 10, the yokes 3, ... made of the galvanized low carbon steel sheet must be annealed for increasing the permeability thereof after forming to the shape shown in FIG. 1 by the press working. Such annealing of the yokes 3, ... is executed in an inactive gas atmosphere at a temperature of about 800° C. for relieving internal stress caused by the press working so as to increase the permeability of the yokes 3, ....

In the above-mentioned case, zinc on the galvanized steel, however, is melted by such a high temperature during the annealing. Therefore, there is a problem that the annealed yoke 3 lose rust-preventive nature. For solving the problem, a low carbon steel which has not been treated with any surface treatment is used and the above-mentioned annealing is executed after forming the yokes 3, ... by the press working. In this case, however, there is another problem that a rust-preventive plating process is necessary after the annealing. Furthermore, there is still other problems that the yokes 3, ... formed by the press working may be deformed during in cargo working for carrying the yokes 3, ... to and from the plating shop and that the deformed yokes 3, ... have to be corrected.

SUMMARY OF THE INVENTION

Purpose of the present invention is to solve the above-mentioned problems and to provide an improved method for manufacturing yokes to be used in a stepping motor, thereby reducing cost for manufacturing the yoke and increasing permeability of the yoke.

Method for manufacturing a yoke to be used in stepping motor in accordance with the present invention has steps of:

press-working a non-galvanic surface-treated dead soft steel sheet to form a yoke piece having plural pole teeth provided on its periphery; and annealing the yoke piece in an inactive gas at an annealing temperature of about 800° C. to relieve internal stress caused by the press-working.

The surface-treated steel sheet which is, for example, a nickel-plated dead soft steel sheet or aluminized dead soft steel sheet has a good workability by the press working. And the plated nickel or aluminum may not be dissolved, peeled or flaked even when annealing is executed at a high temperature for removing permanent set so as to increase the permeability of the yoke.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

A preferred embodiment of method for manufacturing yokes of a permanent magnet type stepping motor in accordance with the present invention is described.

Figure 1:
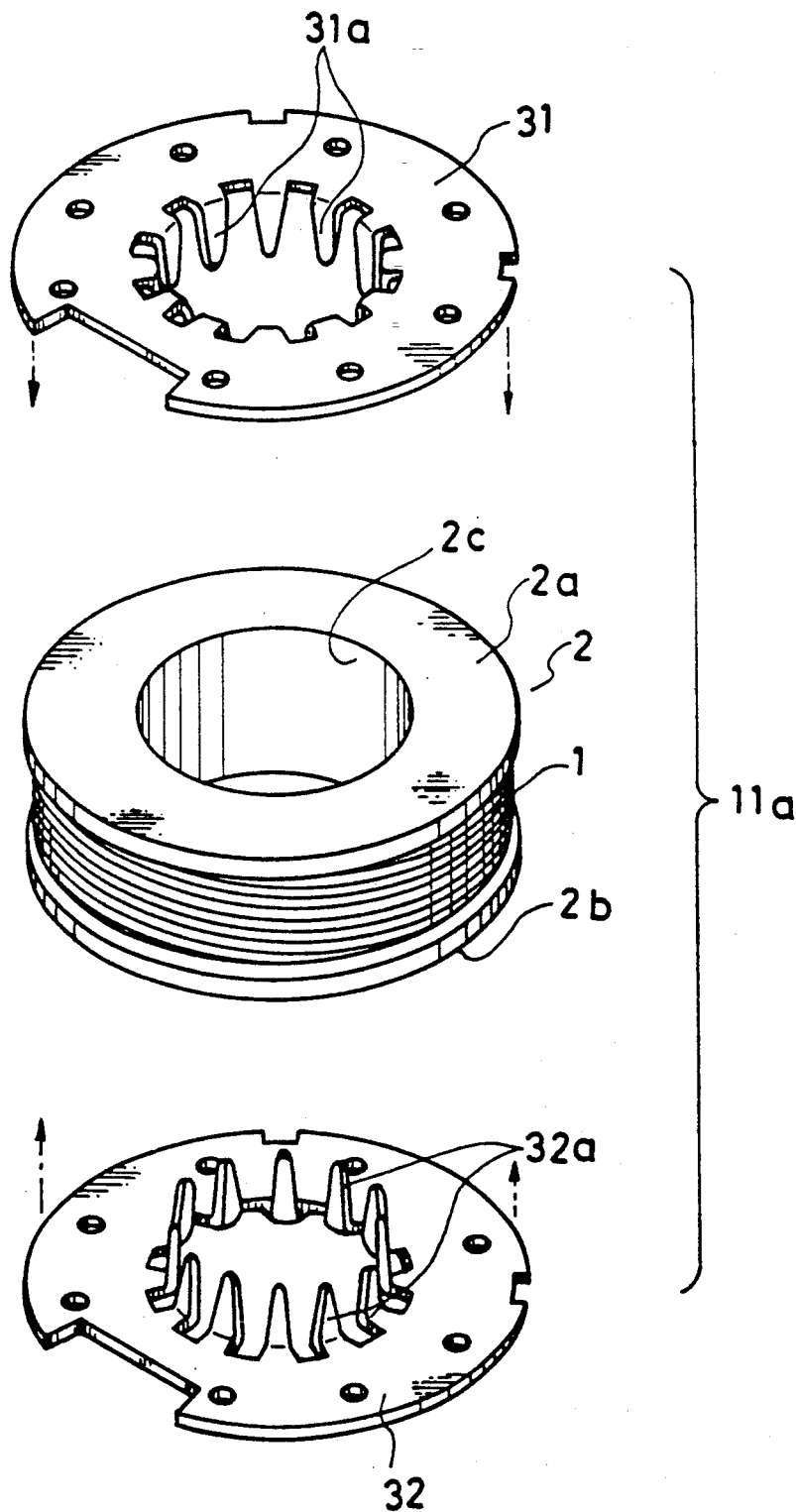
FIG. 1 is the perspective view showing external appearance of yokes to be used in the typical permanent magnet type stepping motor.
Figure 2:
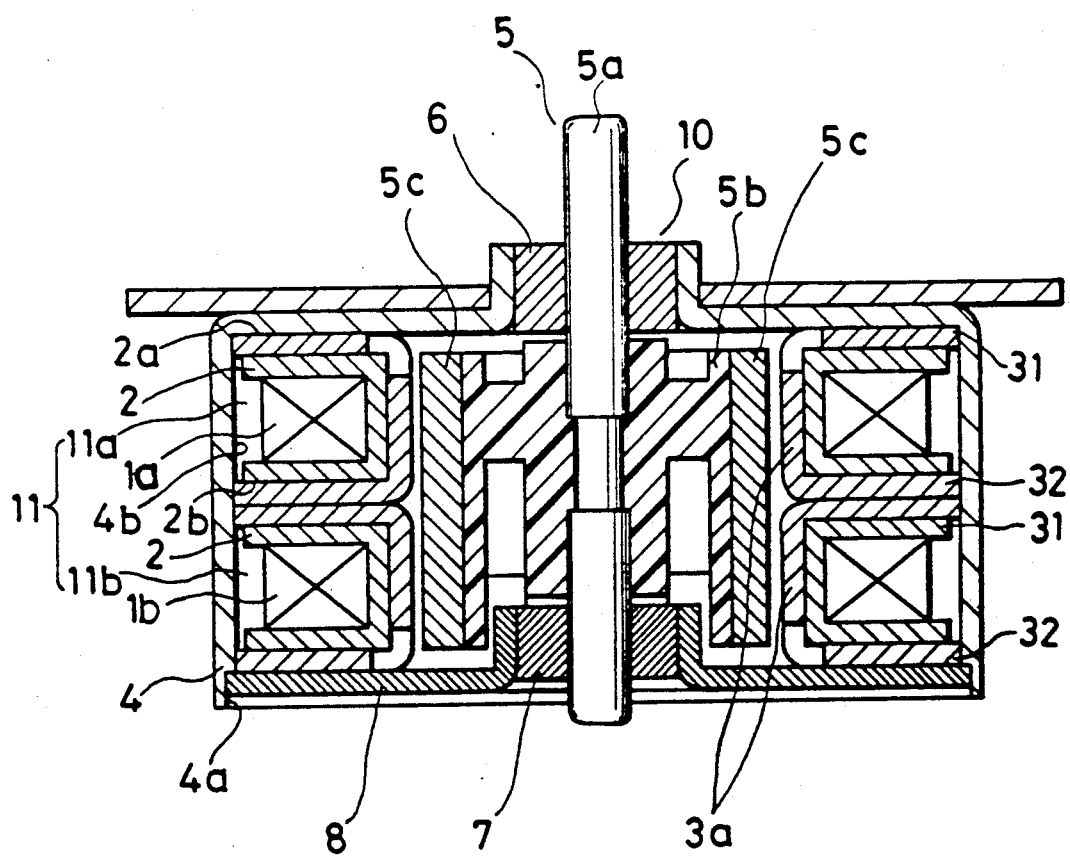
FIG. 2 is the cross-sectional side view showing the constitution of the typical permanent magnet (PM) type stepping motor.

Shape of the yokes in accordance with the present invention is substantially the same as that of the conventional one shown in FIG. 1. At first, surfaces of a steel sheet is nickel plated by known electroplating or the like method. Thickness of surface nickel film is, for example, about 3 μm. As a material of the steel sheet, a dead soft steel containing carbon at a content of 0.01 wt. % or less is used. After that, the yoke 3 having plurality of pole teeth 3a, . . . around an inner periphery thereof is formed by press working. At this time, the surface of the yoke 3 (or steel sheet) is partially elongated about 30% by stress due to reducing working or drawing working. The plated nickel, however, does not peel off or is flaked.

Figure 3:
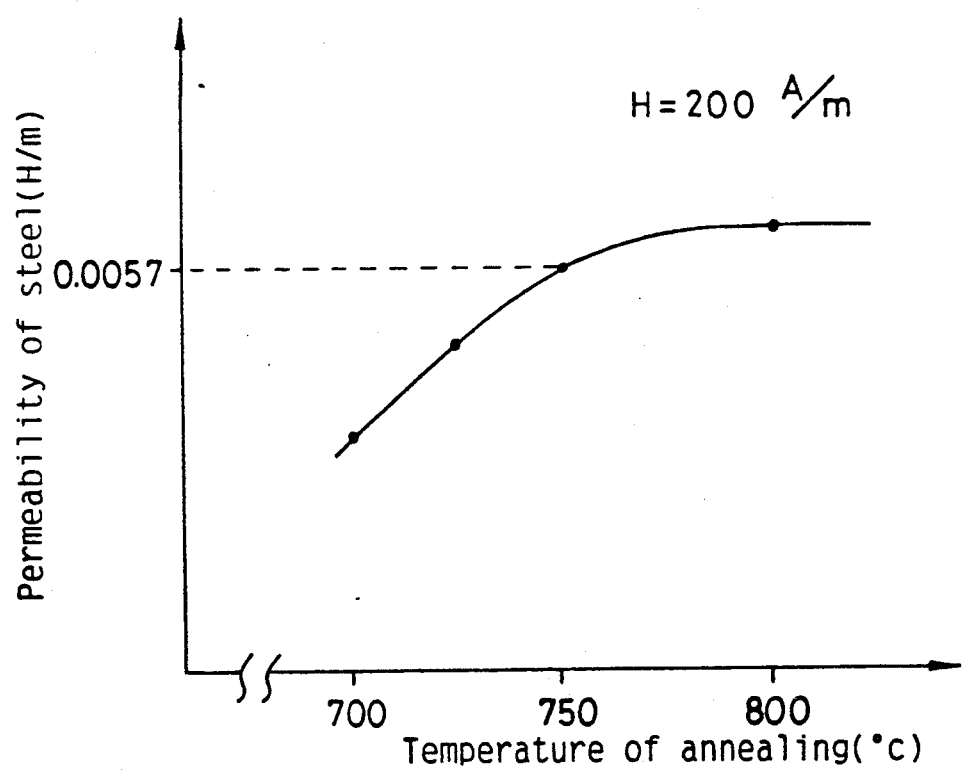
FIG. 3 is a diagram showing a characteristic curve of permeability of a steel against annealing temperatures in accordance with the present invention.

Next, the yoke 3 is annealed about one hour under an inactive gas atmosphere at a temperature in a range of 750°–820° C. for removing residual stress induced by the press working. FIG. 3 is a diagram showing a characteristic curve of permeability of a steel sheet against annealing temperatures in accordance with the present invention. The range of 750°–820° C. of the annealing temperature is obtained from FIG. 3. Thereby, permeability of the yoke 3 is improved. In the annealing process, the atmosphere need not be decarbonized, since the nickel-plated dead soft steel sheet containing very few carbon is used. Therefore, the annealing can be executed in the inactive gas atmosphere.

Hereupon, when the annealing temperature is lower than said lower limit of the predetermined temperature e.g. between 750° C. and 820° C., the residual stress can not be fully removed. On the other hand, when the annealing temperature is higher than 820° C., the plated nickel on the surface of the yoke 3 is peeled off or flaked. Therefore, the 750°–820° C. range of temperature during which the most effective annealing for improving the permeability of the yoke 3 (or the steel) is executed was found through many experiments as shown in FIG. 3. The thickness of the plated nickel was decided so as to resist against the peeling in the press working and anticorrosion after pressing. Even when the thickness of the plated nickel was increased more than 5 μm, the anticorrosion was not improved a more. As a result, the maximum thickness of the plated nickel was limited as 5 μm in view of economy.

As the material to be plated on the surface of the steel, aluminum is also usable; since it can also be press-worked without peel off or flaking, it does not damage the magnetic characteristic of the steel by deep diffusion into the steel sheet, and it prevents corrosion. The aluminum-plated or aluminized steel sheet does not make rust even after leaving for 300 hours under a condition of 40° C. and 90% of humidity. Even though the aluminized steel is discolored to be dark by mutual diffusions between iron and aluminum in the annealing, the anticorrosion ability of the aluminized steel is not damaged.

According to the manufacturing of the yoke in the above-mentioned embodiments a plating process after press-working is no more necessary, since the press-working and annealing are carried out on the already-surface-treated heat resistant steel sheet such as nickel-plated steel sheet or aluminized steel sheet. And there is no more possibility of deforming the worked yoke during the transportation to and from the plating shop. As a result, a high performance PM type stepping motor is provided.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. Magnetic yoke of a stepping motor comprising:
ring-shaped magnetic sheet,
a plurality of teeth-shaped magnetic pole pieces provided to constitute bent-up teeth which are substantially vertical to the face of said ring-shaped magnetic sheet, connected integrally at the periphery of said ring-shaped magnetic sheet; and
corrosion protective metal layer plated on surfaces of said ring-shaped magnetic sheet and said plurality of teeth-shaped magnetic pole pieces,
wherein said corrosion protective metal layer is of nickel.

2. Magnetic yoke of a stepping motor comprising:
ring-shaped magnetic sheet,
a plurality of teeth-shaped magnetic pole pieces provided to constitute bent-up teeth which are substantially vertical to the face of said ring-shaped magnetic sheet, connected integrally at the periphery of said ring-shaped magnetic sheet; and
corrosion protective metal layer plated on surfaces of said ring-shaped magnetic sheet and said plurality of teeth-shaped magnetic pole pieces,
wherein said corrosion protective metal layer is of aluminum.

3. Magnetic yoke in accordance with claim 1, wherein
said magnetic sheet and said magnetic pole pieces are of dead soft steel sheet having a carbon content of below 0.01 wt. %.

4. Magnetic yoke in accordance with claim 2, wherein
said magnetic sheet and said magnetic pole pieces are of dead soft steel sheet having a carbon content of below 0.01 wt. %.

* * * * *